US008715052B2

(12) United States Patent
Bennett et al.

(10) Patent No.: US 8,715,052 B2

(45) Date of Patent: May 6, 2014

(54) TOURNAMENT GAMING SYSTEM

(75) Inventors: Nicholas Luke Bennett, Manly Vale (AU); Paul Thornley, Lane Cove (AU)

(73) Assignee: Aristocrat Technologies Australia Pty Ltd (AU)

( * ) Notice: Subject to any disclaimer, the term of this patent is extended or adjusted under 35 U.S.C. 154(b) by 914 days.

(21) Appl. No.: 11/573,427

(22) PCT Filed: Aug. 11, 2005

(86) PCT No.: PCT/AU2005/001208

§ 371 (c)(1),
(2), (4) Date: Jan. 4, 2010

(87) PCT Pub. No.: WO2006/015442

PCT Pub. Date: Feb. 16, 2006

(65) Prior Publication Data

US 2010/0137052 A1 Jun. 3, 2010

(30) Foreign Application Priority Data

Aug. 11, 2004 (AU) ................................ 2004904539

(51) Int. Cl.

*A63F 9/24* (2006.01)
*A63F 13/00* (2014.01)
*G06F 17/00* (2006.01)
*G06F 19/00* (2011.01)

(52) U.S. Cl.

USPC .................. 463/16; 463/17; 463/18; 463/20; 463/26; 463/42; 273/292

(58) Field of Classification Search

USPC ............... 463/16, 17, 18, 20, 26, 42; 273/292
See application file for complete search history.

(56) References Cited

U.S. PATENT DOCUMENTS

| | | | | |
|---|---|---|---|---|
| 6,012,982 | A * | 1/2000 | Piechowiak et al. | 463/16 |
| 2002/0177483 | A1* | 11/2002 | Cannon | 463/42 |
| 2003/0104854 | A1* | 6/2003 | Cannon | 463/16 |
| 2003/0109307 | A1 | 6/2003 | Boyd | |
| 2003/0114218 | A1 | 6/2003 | McClintic | |
| 2003/0127793 | A1* | 7/2003 | Adams | 273/138.2 |
| 2004/0072602 | A1* | 4/2004 | Toyoda | 463/10 |
| 2005/0054418 | A1* | 3/2005 | Baerlocher | 463/20 |
| 2005/0079911 | A1* | 4/2005 | Nakatsu | 463/26 |
| 2005/0159207 | A1* | 7/2005 | Thomas | 463/20 |
| 2008/0076527 | A1* | 3/2008 | Low et al. | 463/25 |

* cited by examiner

FOREIGN PATENT DOCUMENTS

EP 1380998 1/2004

OTHER PUBLICATIONS

International Search Report, PCT/AU2005/001208.

*Primary Examiner* — Adetokunbo O Torimiro
(74) *Attorney, Agent, or Firm* — McAndrews, Held & Malloy, Ltd.

(57) ABSTRACT

A gaming system (50) has a controller (52) in communication with a plurality of gaming machines (10) that are operable by a player to play at least one base game (16). Each of the plurality of gaming machines (10) can participate in a secondary game that is common to the plurality of gaming machines (1) and which has an outcome resulting in the allocation of an award to a player of at least one of the gaming machine (10). A plurality of common events having a randomly determined component that dictates whether the outcome is achieved in the secondary game are displayed to players of the plurality of gaming machines (10). The outcome is capable of being achieved for any one gaming machine (10) without any other gaming machine (10) also achieving the outcome.

19 Claims, 11 Drawing Sheets

TOURNAMENT GAMING SYSTEM

FIELD OF THE INVENTION

This invention relates to a gaming system incorporating a shared game. More particularly, the invention relates to a tournament gaming system and to a method of operating a tournament gaming system.

BACKGROUND

Players who regularly play gaming machines quickly tire of particular games and therefore it is necessary for manufacturers of these machines to develop innovative game features, which add interest to the games. In so doing, it is hoped to keep players interested and entertained and therefore willing to continue playing the game, as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features that are popular with the players as a mechanism for improving sales, retaining customers and attracting new customers.

An increasingly popular method of playing gaming machines is for players of the gaming machines to either work together or compete against each other for a common prize. This provides the players with a heightened sense of anticipation and enjoyment.

U.S. Pat. No. 6,089,980 describes linking gambling machines to each other and jointly filling a jackpot. A bonus game is provided where players put a bet on an occurrence of a game result (e.g. the outcome of a simulated horse race). The final game is activated simultaneously in all participating gambling machines and it is determined in the final game which of the players has correctly played the displayed game result. The jackpot is paid out according to the determined rank sequence and winning quota.

U.S. Pat. No. 6,375,568 describes an interactive gaming system comprising a plurality of gaming machines, each comprising a wagering game and a theme game, and a controller for electronically linking the gaming machines. In one embodiment, the plurality of players play the wagering game as a group, wherein if one player's theme game results meet predetermined criteria, that particular player will play for the group. In another embodiment, the plurality of players play as a group wherein activation of each player's wagering game either helps or hinders the group in a whole in its effort to achieve a predetermined goal. In a further embodiment, the players play their respective wagering game so as to directly compete against each other in the theme game.

International patent publication number WO03/046850 describes deploying a single bonus wheel in sight of the gaming devices and in addition, each gaming device includes an additional graphics display to display bonus game results. The bonus game involves a game using a spinning wheel and players qualify for the bonus game through play of a base game and may quality multiple times. Before, concurrently with, or subsequent to the spin of the wheel, a controller randomly draws an entry from the total combined pool of entries associated with all qualified base games and awards the bonus to the gaming device (and player) associated with the winning entry, which may also be characterized as a "raffle ticket", the determination of the winning player being implemented as a random drawing, or raffle. Players with more entries or raffle tickets have a higher probability of winning the bonus award, but receive the same return or payback on their investment in base game play as players with fewer entries, due to their greater investment in base game play to obtain the additional entries.

It is an object of the present invention to provide a gaming system incorporating a shared game between gaming terminals and/or a method of operating a gaming system incorporating a shared game between gaming terminals that provides increased interest and entertainment for at least some players over such systems and methods at present, or at least to provide a gaming system and/or a method of operating a gaming system that provides the public with a useful choice.

Any reference in this specification to the prior art does not constitute, nor should it be considered, an admission that such prior art was widely known or forms part of the common general knowledge in Australia, or in any other jurisdiction, before the priority date of any of the appended claims.

Throughout the specification the term "comprise" and variations on this term including "comprising" and "comprises" are to be understood to imply the inclusion of a feature, integer, step or element, and not to exclude other features, integers, steps or elements.

SUMMARY OF THE INVENTION

According to a first aspect of the present invention, there is provided a gaming system comprising a controller and a plurality of gaming machines, each gaming machine comprising at least one display, operable by a player to play at least one base game, and being in communication with the controller, the gaming system allowing each of the plurality of gaming machines to participate in a secondary game that is common to the plurality of gaming machines and which has an outcome, the outcome resulting in the allocation of an award to a player of at least one of the plurality of gaming machines, wherein the controller causes a plurality of events in the secondary game to be displayed to players of the plurality of gaming machines, the plurality of events being common to every one of said plurality of gaming machines and having a randomly determined component that dictates whether the outcome is achieved by any one of said plurality of gaming machines, wherein the outcome is capable of being achieved for any one of the plurality of gaming machines without any other one of the plurality of gaming machines also achieving the outcome.

Preferably, the plurality of events is the selection of a subset comprising a first number of pieces of information from a set comprising a second number of pieces of information, the first number being at least two and the second number being greater than the first number, and wherein the selection is random and comprises the randomly determined component that dictates whether the outcome is achieved by any one of said plurality of gaming machines. During play of the secondary game, each gaming machine may display to its respective player a second set comprising a third number of pieces of information and wherein the outcome is capable of being achieved for any one of the plurality of gaming machines without any other one of the plurality of gaming machines also achieving the outcome because of variations in the third set between gaming machines. The second set may comprise pieces of information selected from the set comprising a second number of pieces of information. The secondary game may be a bingo game, whereby the subset is formed by the sequential random selection of bingo balls and the second set is formed by the random determination of a bingo card for each gaming machine. Alternatively, the secondary game may be selected from the group comprising bingo, poker, keno and blackjack.

Preferably, the plurality of events comprises a series of events over a period of time and wherein the gaming system includes at least one indicator that, during play of the secondary game provides an indication of the progress that each gaming machine has made towards the outcome relative to at least one other gaming machine in the plurality of gaming machines. The at least one indicator may comprise representations on the at least one display of each of the plurality of gaming machines. The gaming system may display the position of each gaming machine on a display that is viewable by onlookers to the gaming system. The at least one indicator may comprise representations of the rank of the gaming machine in an order comprising the gaming machine that is closest to achieving the outcome to the gaming machine that is furthest from achieving the outcome in the plurality of gaming machines. The at least one indicator may comprise representations that show the extent that each gaming machine of said plurality of gaming machines is behind the gaming machine that is closest to achieving the outcome.

Preferably, the award is a progressive prize that has been contributed to by play of the base game on each of the plurality of gaming machines.

Preferably, the award is variable and one of the duration and expected duration of the secondary game is dependent on the size of the award.

Preferably, there are, a plurality of different awards that are awardable as a result of play of the secondary game. One of the plurality of awards may be selected for each game of the secondary game. In an alternative embodiment that may be applied when the plurality of events are sequential, the secondary game may result in multiple outcomes that occur after a differing number of the plurality of events have been displayed and wherein at least two of said outcomes result in the allocation of an award to a player of at least one of the plurality of gaming machines.

Preferably, the gaming system includes at least one further display that is located generally above the plurality of gaming machines and is controlled by the controller, wherein the plurality of events are displayed on the at least one further display.

Preferably, the plurality of gaming machines that participate in the secondary game are selected from all gaming machines that are in communication with the controller according to predetermined selection criteria. The predetermined selection criteria may comprise at least one from the set of all gaming machines that are currently being played, a selection of gaming machines that are currently being played according to further predetermined selection criteria, and gaming machines that progress past a qualifying round.

According to a second aspect of the present invention, there is provided a method of providing a bonus game for a gaming system comprising a plurality of gaming machines, the method comprising monitoring the plurality of gaming machines for a trigger event and on occurrence of the trigger event initiating a secondary game on at least two gaming machines of the plurality of gaming machines, the secondary game comprising, for said at least two gaming machines, the steps of determining an initial game state for each gaming machine, the initial state determined randomly for each gaming machine, randomly selecting a plurality of events that combine with the initial game state to show the progression of the secondary game from the initial game state to a final game state, the plurality of events being common across each gaming machine, and then identifying any winning gaming machines from said plurality of gaming machines and allocating an award accordingly.

Preferably, there are at least three events in said plurality of events and the plurality of events are displayed sequentially, thereby revealing the progression of the secondary game from the initial state to the final state through at least one intermediate state.

Preferably, the gaming machines compete against each other for the award and the award is allocated only to the winning gaming machine or machines.

Preferably, the secondary game is selected from the group comprising poker and blackjack, wherein the step of determining an initial game state for each gaming machine involves determining part of a hand that is allocated to each gaming machine and the step of randomly selecting a plurality of events that combine with the initial game state to show the progression of the secondary game from the initial game state to a final game state involves determining the remainder of the hand for each gaming machine.

Preferably, the secondary game is selected from the group comprising bingo and keno, wherein the step of determining an initial game state for each gaming machine involves determining a bingo card or a keno ticket for each gaming machine and the step of randomly selecting a plurality of events that combine with the initial game state to show the progression of the secondary game from the initial game state to a final game state involves selecting bingo balls or keno balls.

Further aspects of the present invention will become apparent from the following description, which is provided by way of example of preferred embodiments only and with reference to the accompanying drawings.

DETAILED DESCRIPTION OF PREFERRED EMBODIMENTS

The present invention relates to a gaming system that incorporates a shared bonus game, particularly to a gaming system that incorporates a tournament bonus game, where separate but linked gaming machines "compete" to win a prize or a portion of a prize. The competition between gaming machines may be independent of any actions of the players, or may depend or appear to depend, at least to some extent, on the actions of the players at each of the gaming machines that are participating in the tournament bonus game.

Figure 1:
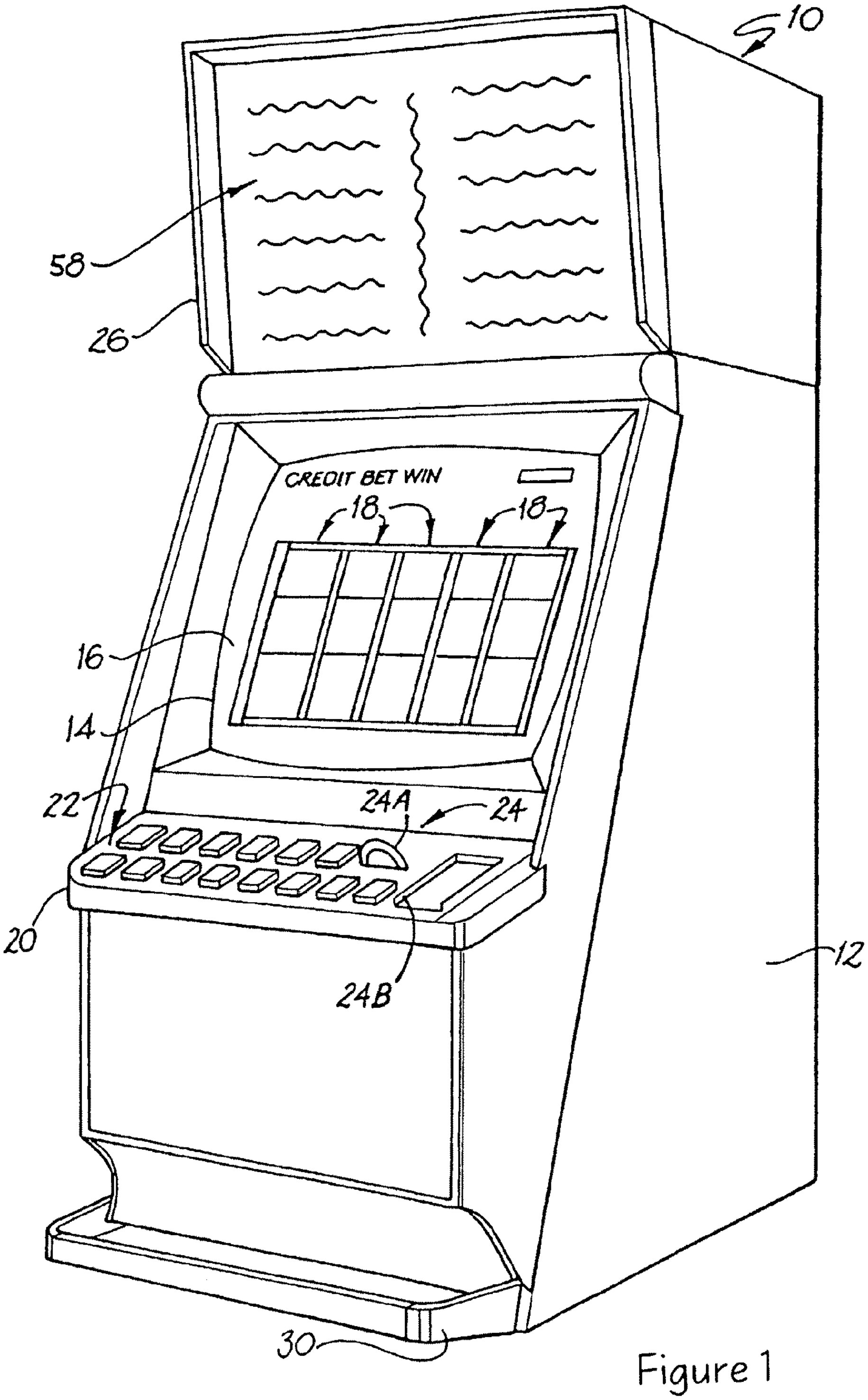
FIG. 1 shows a perspective view of a gaming machine that is suitable for use as part of a gaming system in accordance with the present invention.

In FIG. 1, reference numeral 10 generally designates a gaming machine, which may be used as part of an embodiment of a gaming system of the present invention. The gaming machine 10 includes a console 12 having a display 14 on which representations of a base game, which is generally referenced by numeral 16, are shown. The display 14 may be a video display implemented as a cathode ray screen device, a liquid crystal display, a plasma screen, or may be any other suitable display device, the selection of which may depend on the particular base game 16 of the gaming machine 10.

The gaming machine 10 includes a top box 26 on which a secondary display 58 is carried. The secondary display 58 may display information such as paytables, details of bonus awards, etc. In alternative embodiments of the present invention, the top box 26 may be omitted, with information that is required to be displayed to the player provided elsewhere. A coin tray 30 is mounted beneath the console 12 for cash payouts from the gaming machine 10.

A midtrim 20 of the gaming machine 10 houses a bank of buttons 22 for enabling a player to play the base game 16. The midtrim 20 also houses a credit input mechanism 24 including a coin input chute 24A and a bill collector 24B.

The term "base game" is used herein to distinguish a game that is played on the gaming machine 10 independently of any other gaming machine 10 (with the exception of any common prize such as a progressive prize), from a shared game, which may be a tournament bonus game, in which the gaming machine 10 is only one of a number of participating gaming machines and the tournament bonus game on one gaming machine 10 is at least partly dependent on at least one other gaming machine.

The base game 16 is any suitable base game, such as a spinning reel game, which simulates the rotation of a number of spinning reels 18. Other base games or standard games include card games, ball games etc. A player of the gaming machine 10 may be able to play more than one base game 16 on the gaming machine 10, with each base game 16 being stored in computer memory either locally at the gaming machine 10 or remotely in a database that the gaming machine 10 is in communication with, for example through a suitable gaming machine controller (not shown in FIG. 1).

Figure 2:
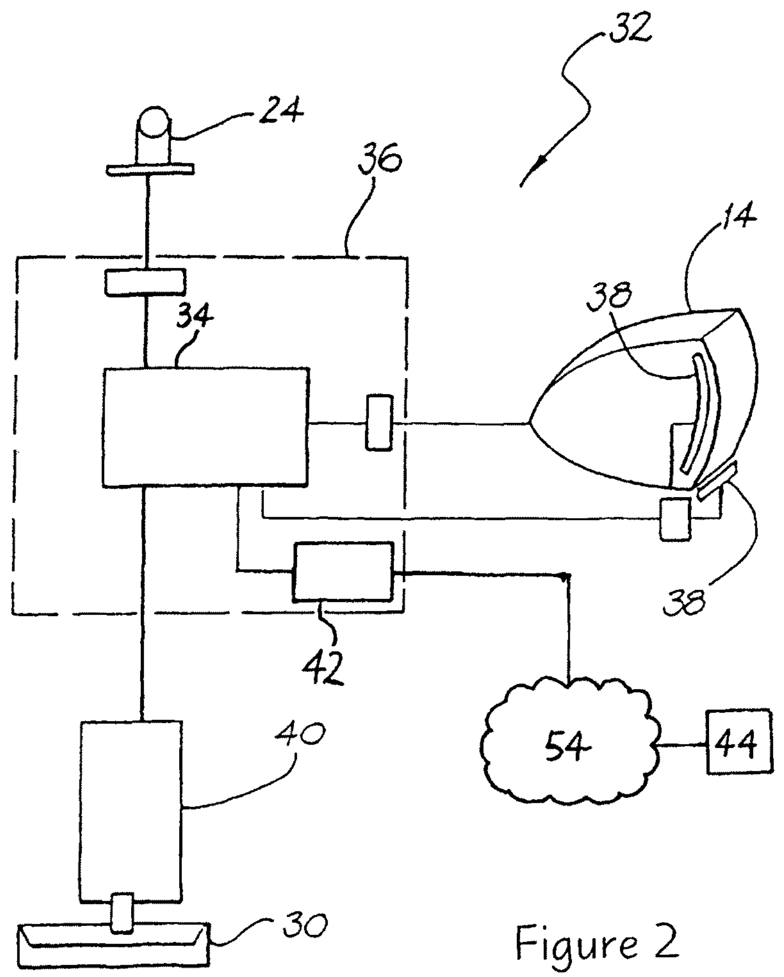
FIG. 2 shows a block diagram of a control circuit of the gaming machine shown in FIG. 1.

Referring to FIG. 2 of the drawings, a control circuit 32 for the gaming machine 10 is shown. A program which implements the base game 16 and associated user interface is run on a processor 34. The processor 34 forms part of a controller 36 that drives the screen of the display 14 and that receives input signals from sensors 38. The sensors 38 include sensors associated with the bank of buttons 22 and touch sensors mounted in the screen of the display 14. The controller 36 also receives input pulses from the credit input mechanism 24 to determine whether or not a player has provided sufficient credit to commence playing. The credit input mechanism 24 may, instead of the coin input chute 24A and/or the bill collector 24B, or in addition thereto, be a credit or smart card reader (not shown) or any other type of validation device. The controller 36 also drives a payout mechanism 40, which for example, may be a coin hopper for feeding coins to the coin tray 30 to make a pay out to a player when the player wishes to redeem his or her credit. The controller 36 includes a communication interface 42, enabling the controller 36 to communicate with at least one other computational device 44, optionally through a computer network 54. The communication interface 42 may be, for example, a network card. The communication interface 42 allows the gaming machine 10 to be linked, in the preferred embodiment indirectly through the network 54, to other gaming machines, a controller for the gaming machine 10 and/or a controller for the tournament bonus game, such devices being represented generically in FIG. 2 by the computational device 44.

Those skilled in the relevant arts will appreciate that the gaming machine 10 that is described in relation to FIGS. 1 and 2 of the accompanying drawings is only one example of many variations of gaming machines that may be used with the gaming system of the present invention. The gaming machine 10 may include many other components to perform functions such as additional computations, communications and monitoring of play. FIGS. 1 and 2 and their associated description herein are provided to give a background to the environment in which the present invention may be implemented.

Those skilled in the relevant arts will also appreciate that the architecture of the gaming machine 10 described herein is only one example of a large number of possible alternative gaming machine architectures that may be used with the present invention. By way of example only, one architecture of a gaming machine is to have one or more displays, a user interface, a game controller and a transaction handling unit for accepting and paying credits or currency in some form, all located together in a single housing or in a plurality of physically connected housings. This is the architecture of the gaming machine 10. A second example architecture of a gaming machine is to have a display and a user interface located at a separate location from a game controller, wherein the game controller communicates with the display and the user interface through a fixed wire or wireless communication channel. A third example architecture of a gaming machine is to have a first and a second display, the second display being located separate from the first display and optionally shared by a plurality of gaming machines. The second display may be controlled by a separate controller from a controller for the first display, the two controllers being in communication with each other. In addition, a gaming machine 10 used with the present invention does not necessarily require the wagering of a stake in order to play the base game.

Figure 3:
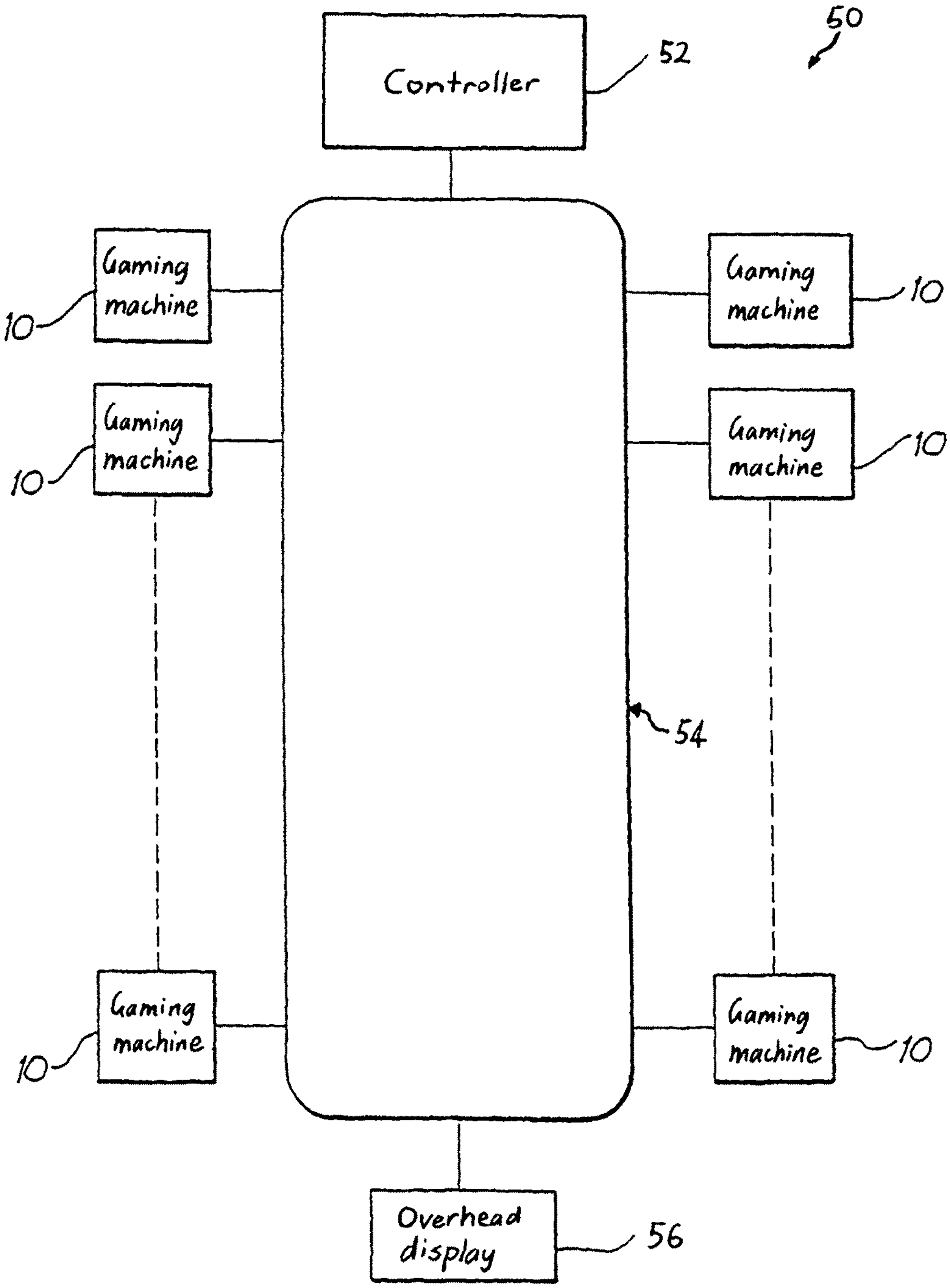
FIG. 3 shows a block diagram of a gaming system, in accordance with an embodiment of the present invention.

Referring now to FIG. 3, a gaming system 50 according to an embodiment of the present invention comprises a plurality of the gaming machines 10 connected to a controller 52 via the network 54. The gaming system 50 includes an overhead display 56 associated with a plurality of the gaming machines 10, which may be located remote to all, or all but one or a few, of the gaming machines 10.

An implementation of the gaming system 50 is as a PC-based system, in which case the controller 52 is a server, which controls operation of a shared game on the gaming machines 10. Therefore, the gaming machines 10 could be implemented as client terminals. In a preferred configuration, the players of the gaming machines 10 are able to select the base games 16 that they wish to play on their gaming machines 10 from a set of available base games stored on the controller 52 (or another controller in communication with the network 54). A program for the shared game may reside within the gaming machines 10 to be driven by the gaming machine control circuits 36 according to results obtained by the controller 52 and communicated to the control circuits 36 through their respective communication interface 42. Alternatively, the controller 52 may download graphics to the individual gaming machines 10, thereby temporarily taking control of the images displayed on at least one display of the gaming machines 10.

Figure 4:
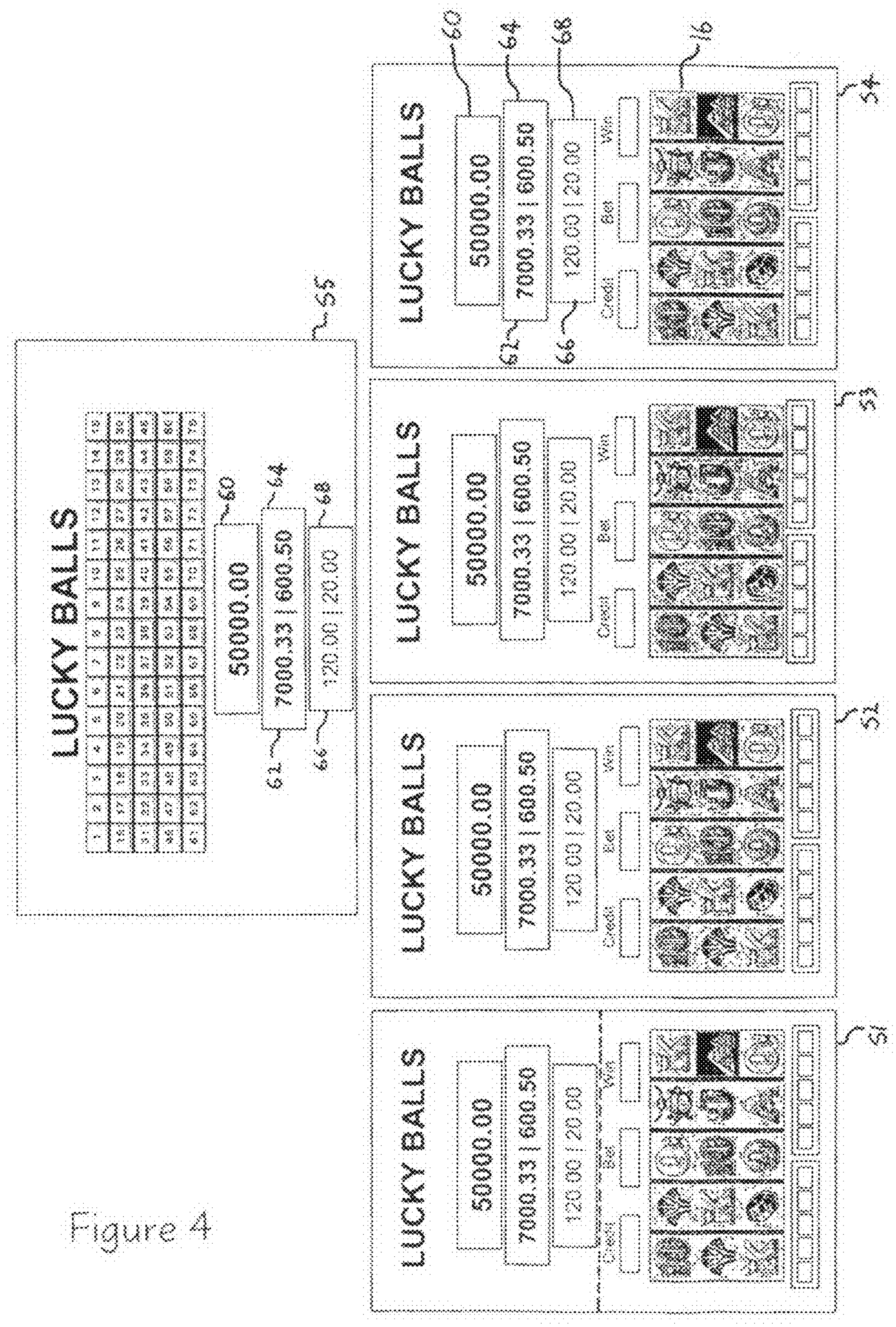
FIG. 4 shows a pictorial representation of the gaming system of the present invention, before a shared game of the present invention has commenced.

Referring now to FIG. 4, five screen displays are shown. The lower four screen displays S1-S4 are displayed on a gaming machine 10 and the upper screen display S5 on the overhead display 56. The screen displays S1-S4 show an amalgamation of representations that may could be provided on a single physical display device of sufficient size and appropriate dimensions, or optionally appear separately on the display 14 and the secondary display 58 of the gaming machine 10 if required. While in the preferred embodiment the upper screen display S5 shows representations that appear on the overhead display 56, the information may be provided elsewhere, for example on the secondary display 58 of each gaming machine, particularly where the screen displays S1-S4 are provided entirely on the display 14. For convenience and clarity, unless otherwise stated, the following description assumes that the representations in screen displays S1-S4 downwards and inclusive of the words "Credit", "Bet" and "Win" are displayed on the display 14 and the remainder of the representations are displayed in the secondary display 15. This division is shown as a dashed line in the screen display S1.

Each of the gaming machines 10 is configured to display a screen S1-S4 during play of the base game 16 (reference numeral indicated for screen display S4 only), which in the example shown, is a spinning reel game, and display the game using the display 14. Although the screen displays S1-S4 all show the same base game 16, this is not essential. Also, it will be appreciated that, unlike the reels shown in the screen displays S1-S4, the status of the reel game will differ from machine to machine.

The secondary display 58 displays a plurality of progressive prizes 60, 62, 64, 66 and 68 (reference numerals again indicated for screen display S4 only) for which players competing in the tournament can play, as will be described in greater detail below. These progressive prizes 60-68 are reproduced in screen display S5 on the overhead display 56, at least when the gaming system 50 is operating in a tournament mode (described in more detail later herein). Prior to commencement of a shared game on the participating gaming machines 10, the prize, or prizes, to be played for in the shared game may be displayed on the secondary display 58. During playing of the shared game, information relating to progress of the shared game may be displayed on the secondary display 58.

Providing a plurality of progressive prizes represents the preferred embodiment of the present invention, as it may maximize the interest in the gaming machines 10. However, in an alternative and less preferred embodiment only a single progressive prize or one or more prizes other than progressive prizes may be available to be won, and displayed by the gaming machines 10.

The player of each gaming machine 10, when the gaming machines 10 are playing in stand-alone mode, can optionally select the base games 16 that they wish to play and these games are played independently of the games played on any of the other gaming machines 10.

When a predetermined trigger condition occurs, the gaming system 50 enters a shared game, or when the shared game is competitive a tournament mode. The following description is provided with reference to a competitive shared game. In the tournament mode, at least two gaming machines 10 compete for a specific, common goal and the first gaming machine 10 that achieves that goal is awarded the relevant one of the prizes 60-68 being played for in the tournament. Subject to any restrictions that may be imposed by the type of prize being played for (e.g. whether it is a progressive prize or a fixed prize and the magnitude of the prize), any suitable trigger condition may cause the gaming system 50 to enter the tournament mode. The trigger methods used could be server based or gaming machine based. For example, any style of standard, progressive jackpot trigger or a standard gaming machine based game trigger could be used.

Examples of server-based triggers include a counter at the controller 52 that accumulates turnover from all of the gaming machines 10 and triggers tournament mode once a pre-defined amount of turnover has occurred;

the controller 52 makes a random determination of the amount of turnover required before the tournament will be triggered, such as for a standard mystery progressive trigger;

the controller 52 makes continuous random determinations at fixed intervals, where the chance of the tournament being triggered is dependent on the amount of turnover accumulated across all relevant gaming machines 10 during that interval.

Examples of gaming machine based triggers include a random determination for each bet that is made on each gaming machine, where the chance of the tournament being triggered is dependent upon the size of the bet on the gaming machine 10;

a random determination for each game played on each gaming machine 10 such that the chance of triggering the tournament is independent of bet size and the same for each game played;

a standard symbol based trigger—for example three or more scatter symbols appearing during base game play on one of the gaming machines 10 triggers the tournament;

other types of symbol based triggers such as special tournament symbols being overlaid over standard reel symbols or appearing in the background of standard reel symbols, where certain combinations of the special tournament symbols trigger the tournament.

Regardless of the trigger condition and the manner in which it is implemented, once a tournament has been triggered, the controller 52 determines which gaming machines 10 are eligible to enter the tournament. The controller 52 could be programmed so that all the gaming machines 10 that are currently being played are eligible. Alternatively, only a subset of the gaming machines 10 being played may enter the tournament. For example, the controller 52 may randomly select a predetermined number of the gaming machines 10 that are currently being played, or the gaming machines 10 currently being played may play a qualifying round, where each one that accumulates a predetermined number of points enters the tournament.

Once the controller 52 of the gaming system 50 has determined the gaming machines 10 that are to participate in the tournament, sounds and animations occur on the participating gaming machines 10 and the overhead display 56 heralds the commencement of the tournament. In one preferred embodiment of the invention, the tournament may be one of a number of gaming-type games where a plurality of events dictates play of the game, such as bingo, keno, or modified forms of poker, blackjack, spinning reel games, or the like. For bingo and keno, the plurality of events is the drawing of balls. For poker and blackjack the plurality of events may be the allocation of cards, preferably three or more cards, to complete each player's hand. For spinning reel games the plurality of events may be a number of spins of the reels until a winning combination occurs. To add suspense and anticipation to the game, the plurality of events preferably occurs sequentially, as is normal for play of bingo (an alternative not involving the sequential display of steps being the computer selecting a set of bingo balls that results in at least one winner and displaying all the balls simultaneously).

Generally, the bonus game may include displaying random elements for each gaming machine 10 such that there are differences in the displays shown for each gaming machine, those differences enabling a different outcome for the bonus game for a particular gaming machine 10 from the other gaming machines participating in the bonus game. The invention will be described herein with reference to its application to a bingo-type game.

Figure 5:
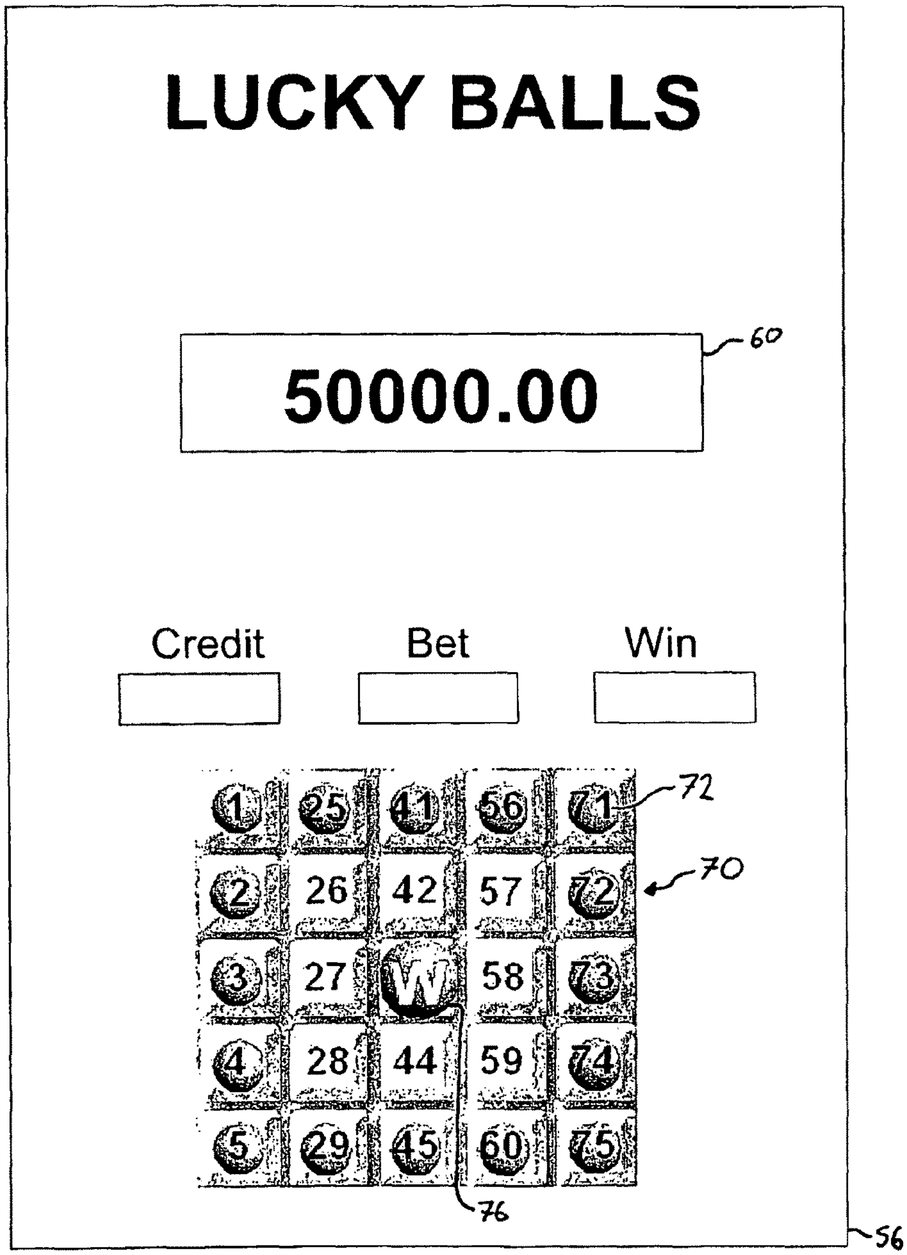
FIG. 5 shows, on an enlarged scale, a display screen of a gaming machine of the gaming system of the present invention, for display during play of a shared game of the present invention.

When the tournament is entered, the display 14 on each of the participating gaming machines 10 changes from the base game 16 to the display of a bingo card 70. FIG. 5 shows a screen display S6 including a bingo card 70, which is again an amalgamation of the representations provided on the display 14 and the secondary display 58. The secondary display 58 also updates to show the prize 60 that is being played for, which in the example in FIG. 5 is the main jackpot having a value of 50000.00. The bingo card, in the embodiment shown in FIG. 5, comprises a five by five array of numbers 72 (only the top right hand number 72 has been provided with a reference label). By way of example and with specific reference to a particular form of the bingo game, for each bingo card 70, the controller 52 randomly selects twenty-four numbers from the range 1-75 to allocate to playing squares of the bingo card 70. To add a variation from traditional bingo, in the example shown in FIG. 5, a central square 76 of the bingo card is a free hit or "wild" square of the card 70.

In addition, a pattern to be completed on the bingo card 70 is also highlighted. In FIG. 5 the pattern is indicated by the numbers 72 that have a representation of a ball behind them. As with screen displays S1-S4, the representations in screen display S6 may be provided on a single screen or distributed between the display 14, secondary display 58 and overhead display 56, or on any other suitable screen or display device.

Examples of the types of patterns which may be completed on the bingo card 70 are shown in FIGS. 6*a*-6*e* of the drawings, again using representations of a ball to indicate the pattern in a card that is formed by a five by five array of number positions. Typically, the larger the prize that is being played for, the higher the number of positions in the bingo card 70 that must be filled to complete the pattern.

Figure 7:
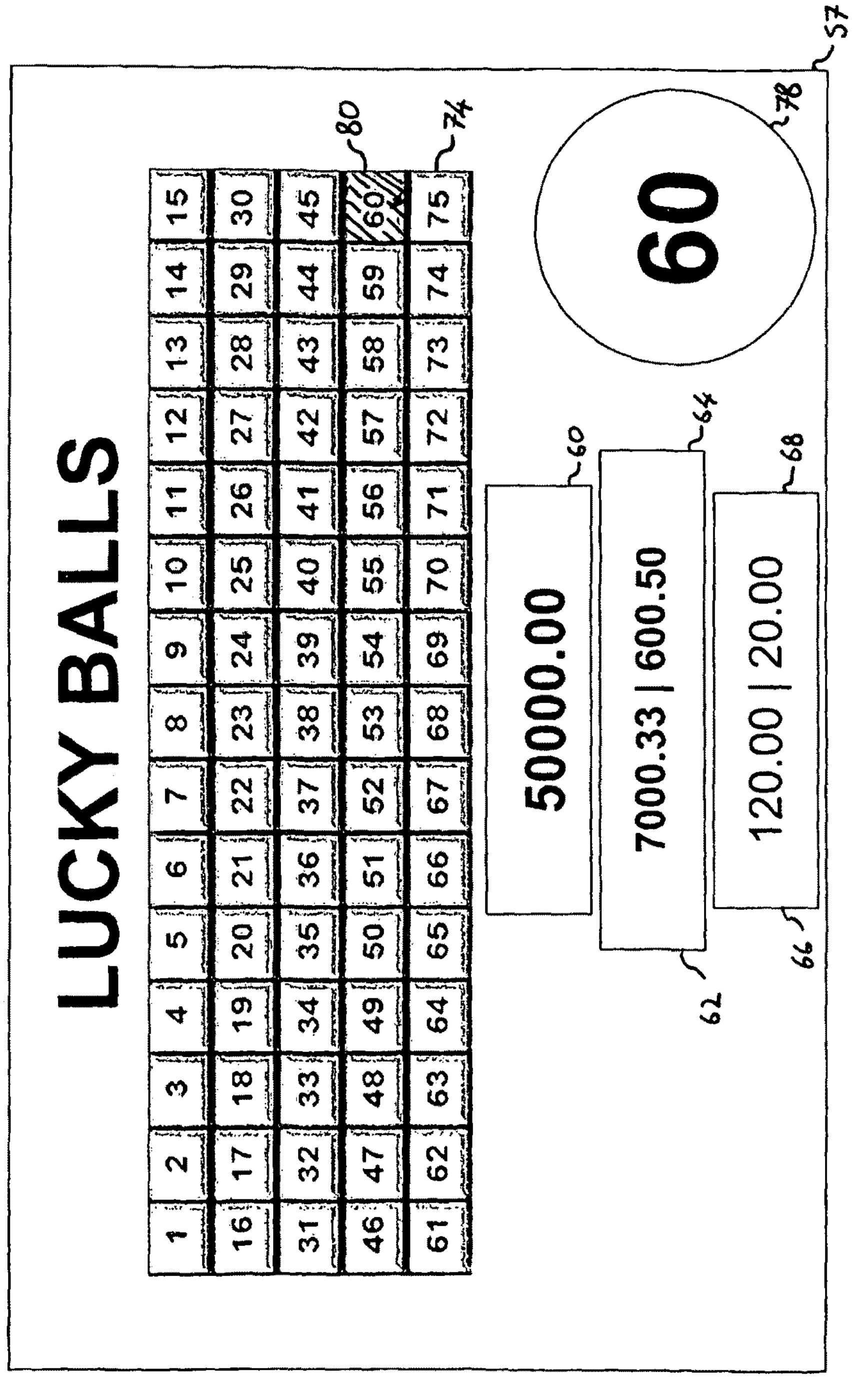
FIG. 7 shows an initial screen display of an overhead display of the gaming system of the present invention, at commencement of a shared game on the system.

Referring now in particular to FIG. 7, a screen display S7 is shown, which at the same time as screen display S6 is shown, is displayed on the overhead display 56. Both screen display S6 and screen display S7 show the tournament at its initial stage, before play has commenced. Prior to entering the tournament mode and showing screen display S7, the overhead display 56 may display a special attract sequence. An unmarked bingo scoreboard 74 is included in the screen display S7. It is preferred that, in between the attract mode sequences while in base game play mode, the display 56 includes the unmarked bingo board 74 and the progressive prizes 60-68. The progressive prizes 60-68 increase in the same manner as for all standard progressives, i.e. by a percentage of every credit bet, or a subset of the credits bet, on any of the linked gaming machines 10. Instead, there may be a dedicated bet that is contributed to the tournament pool and makes the player eligible to participate in the tournament.

The selection of one of the progressive prizes 60-68 may be randomly made by the controller 52, the random selection being weighted in accordance with the start up and increment rates of the progressive levels. In other words, it will be more likely that one of the lower levels of progressive prizes will be selected than the top level progressive prize.

As indicated above, the progressive prize being played for is displayed in the secondary display 58 of each of the participating gaming machines 10. All of the gaming machines 10 participate for the same progressive prize. However, the numbers allocated to the squares of the bingo card 70 for each participating gaming machine 10 are individually randomly selected so that the numbers on the bingo card 70 differ from one gaming machine to the next.

The duration of the tournament is, preferably, dependent on the level of the progressive prize 60-68 being played for. In other words, to draw out the suspense of the tournament feature, the higher the level of prize being played for, the longer the duration of the tournament will be. This may be achieved by having different patterns of matching numbers that need to be completed in order to get "bingo" and win the prize being played for.

Figure 6A:
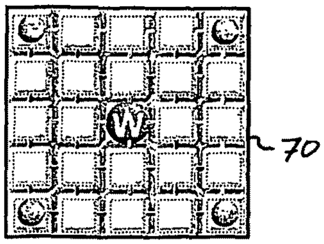
FIGS. 6*a*-6*e* show possible displays of patterns to be completed in a bingo bonus game that may be played on a gaming machine participating in a shared game in the gaming system of the present invention.

The patterns to be completed may therefore be dependent on the prize being played for. When playing for the two smallest prizes 66, 68, the pattern to be completed may be a simple straight line pattern or the four corner positions as shown in FIG. 6*a* of the drawings. In other words, the first bingo card 70 of which one of the five vertical lines, one of the five horizontal lines, one of the two diagonal lines or the four corner positions is completed will win the prize being played for.

When playing for the prize 64, the first gaming machine to complete a cross pattern may win the tournament. That is, the first bingo card 70 on which a pattern of both a horizontal and vertical line through the centre position 76 or the two diagonal lines, as shown in FIG. 6*b* of the drawings, is completed will win the progressive prize 64.

Figure 6D:
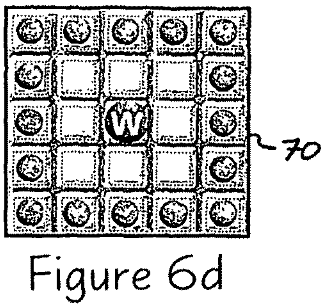
Figure 6B:
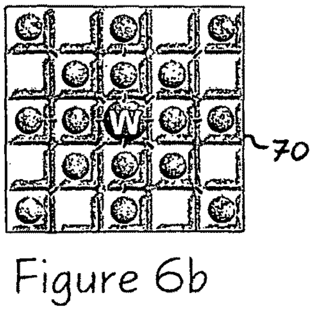
Figure 6E:
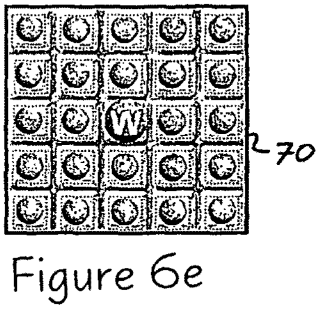
Figure 6C:
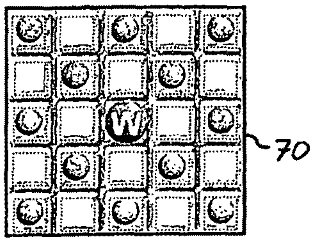

When playing for the progressive prize 62, the pattern 70 to be completed may be a "chess board" pattern as shown in FIG. 6*c* of the drawings.

When playing for the jackpot prize 60, the highest jackpot level, the pattern to be completed may be a picture frame pattern as shown in FIG. 6*d* of the drawings or a completion of all the squares as shown in FIG. 6*e* of the drawings.

In the present example, because the progressive prize 60 has been selected, the pattern of FIG. 6*d* is selected for all the participating gaming machines 10 to complete.

When the tournament feature commences, a number in the range from 1-75 is selected by the controller 52 and is shown as a large ball 78 in the screen display S7 (see FIG. 7). The appropriate square 80 on the bingo board 74 on the overhead display 56 is also highlighted. A ball 82 (see FIG. 8) with the same number as the ball 78 also tracks across the display 14 of each of the participating gaming machines 10.

Figure 8:
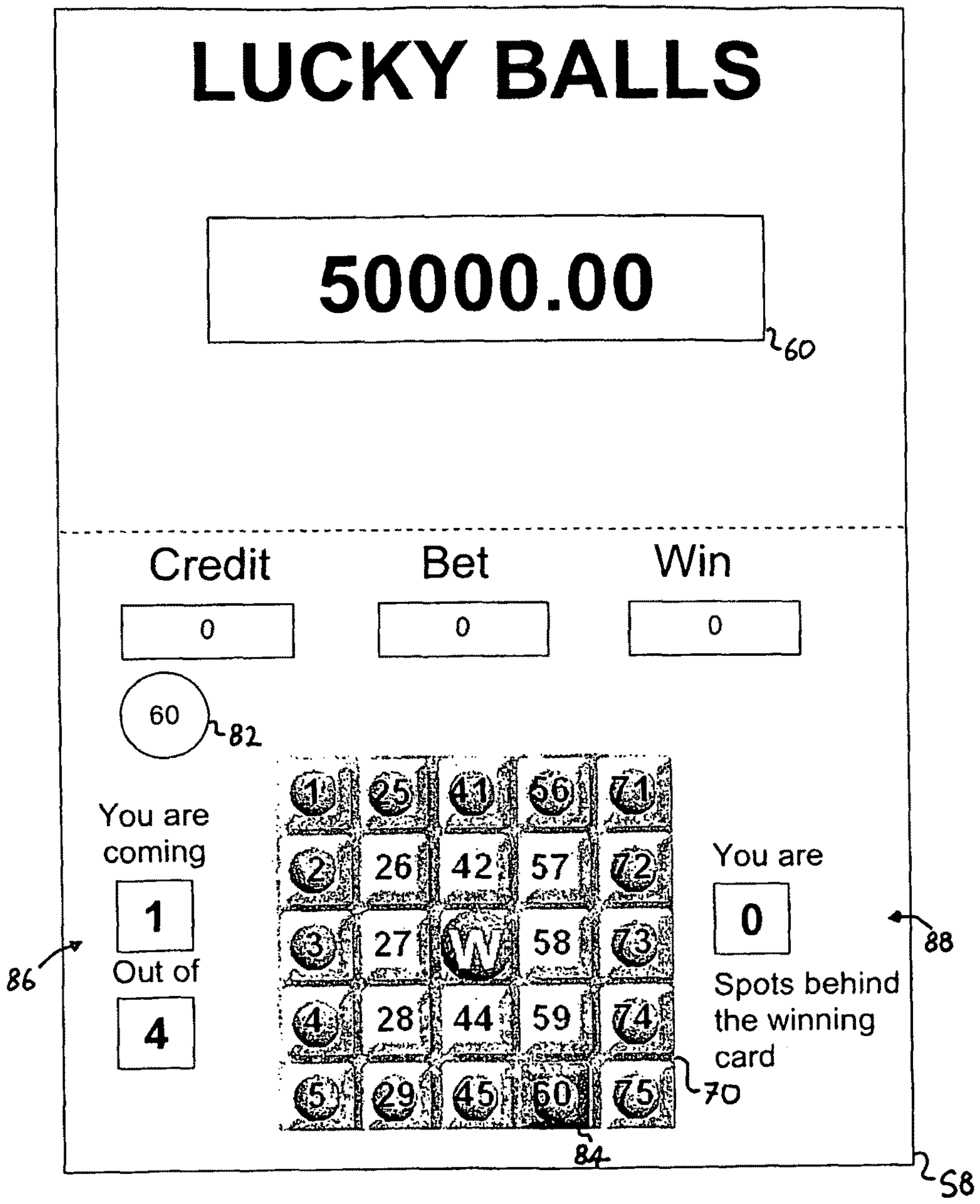
FIG. 8 shows a screen display of one of the gaming machines during an initial step of the shared game in the gaming system of the present invention.

If the participating gaming machine 10 has a square with that number on it, that square is marked or highlighted as shown at 84 in the screen display S8 in FIG. 8 of the accompanying drawings.

The controller 52 keeps a record of the numbers in each position of each card 70 of each of the participating gaming machines 10 as well as matches that have occurred for each gaming machine 10 in order to determine when one or more gaming machines 10 has reached "bingo". It uses this information to update the current status of the game on the screen of each of the gaming machines 10 at the same time that each new number draw is presented in screen displays S7 and S8.

To enhance the excitement of the players, the screen display S8 includes an indicator 86, which indicates to each participating player their position in the tournament. A further indicator 88 is displayed in the screen display S8 to indicate to the participating players, if those participating players are not in the first position, how many "spots" i.e. unmarked squares, those players are behind the card/s of the player/s leading the tournament.

Figure 9:
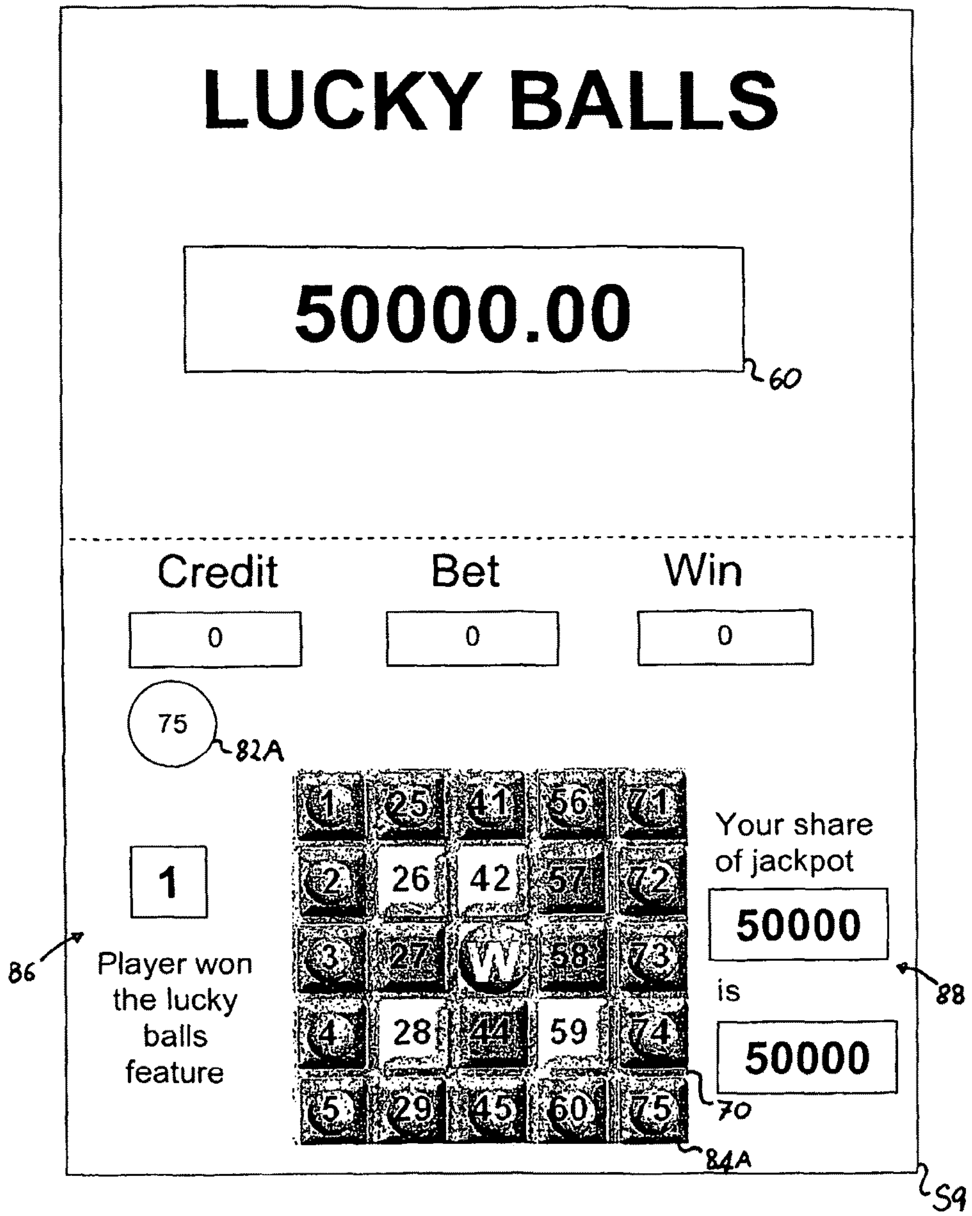
FIG. 9 shows a screen display of the gaming machine at the final step of the shared game in the gaming system of the present invention.

Numbers are drawn and displayed by the controller 52 continuously until, as shown in screen display S9 in FIG. 9 of the accompanying drawings, one of the gaming machines 10 has its pattern on its bingo card completed. In screen display S9, the bingo ball that completed the pattern was ball number seventy-five, indicated by reference numeral 82A in FIG. 9. The final square that was required to complete the pattern is marked with reference numeral 84A. With fanfare and signals, the winning of the tournament is announced. The indicator 86 changes to indicate how many winners there were of that particular bingo tournament. The further indicator 88 changes to indicate what share of the prize 60 each winner has received. In this case, as there was only one winner, the winning player receives the entire prize 60. If multiple gaming machines 10 had completed the pattern simultaneously then each winning gaming machine 10 would have been awarded an equal share of the prize 60.

In the preferred embodiment only a single bingo game is played per tournament. In other words only one pattern is provided as the goal pattern and once a gaming machine 10 completes the pattern the tournament ends. However, for some games, including bingo, a plurality of "bingo" achieving patterns may exist, providing intermediate prizes during course of play before awarding a final prize, which may be a substantial prize in comparison to the intermediate prize or prizes. For example, the first gaming machine(s) to achieve the pattern in FIG. 6*a* may receive twelve free games of the base game, the first gaming machine(s) to achieve the pattern in FIG. 6*c* may receive twenty credits, but the main progressive prize may be reserved for the gaming machine(s) that achieve the pattern in FIG. 6*e*.

Figure 10:
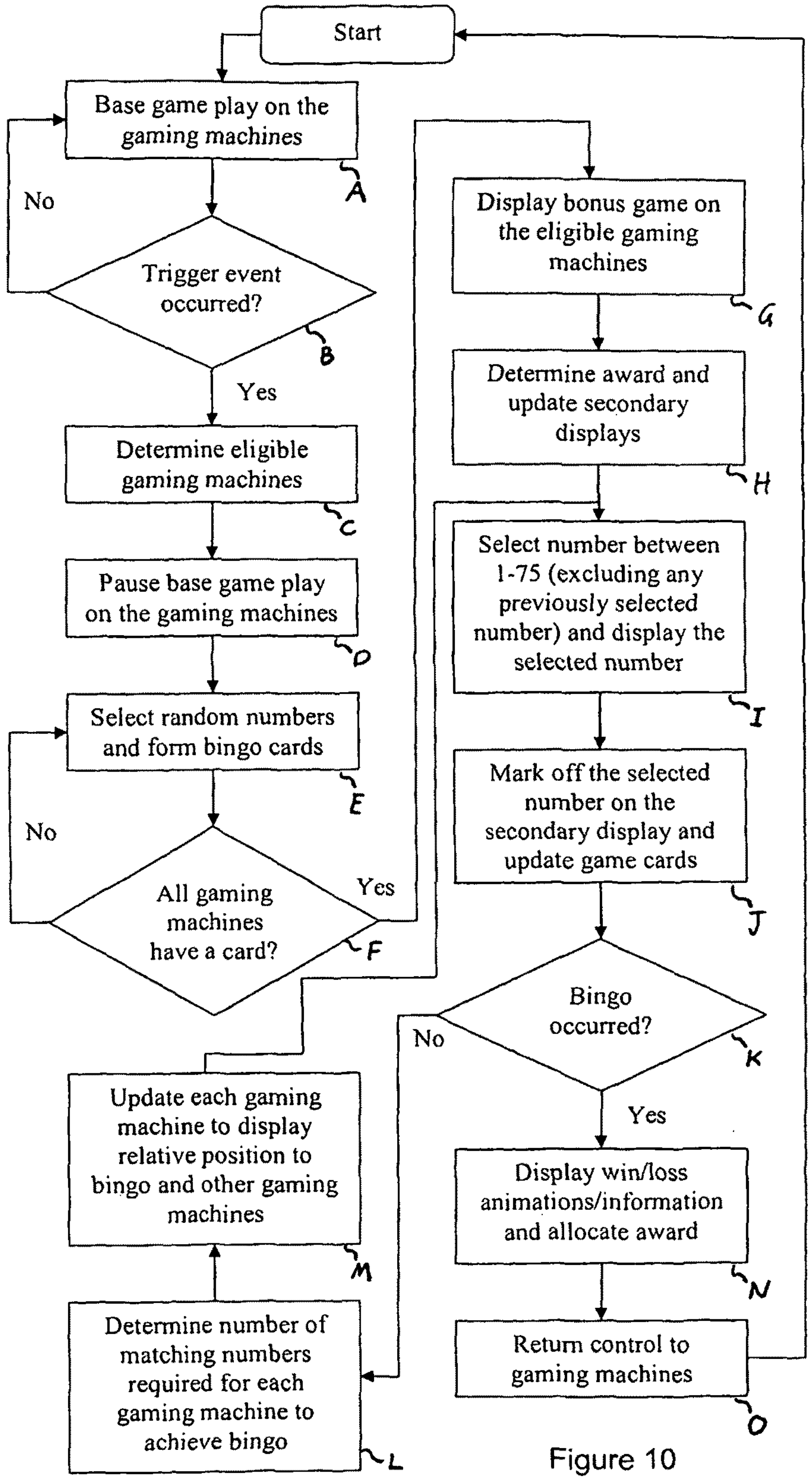
FIG. 10 shows a flowchart of the operation of the gaming system of the present invention.

FIG. 10 shows a flow chart of the functions of the controller 52. Those skilled in the relevant arts will appreciate that the functions described could be performed by a computational device located anywhere, provided it is in communication with the gaming machines 10 through an appropriate communication channel, which may be fixed wire or wireless and which may be a dedicated line or use a network structure. The controller 52 may even be located within one of the gaming machines 10, when optionally the controller 52 and the control circuit 36 of that gaming machine 10 are the same. Furthermore, the functions of the controller 52 may be shared amongst a plurality of computational devices and the control circuit 36 in each gaming machine 10 may perform some of the functions of the controller 52. Some examples of functions that may be performed by either the controller 52 or a gaming machine 10 are provided below, but these are not exhaustive.

The first state A of the controller 52, after any necessary boot procedure, loading of the required applications, establishment of communications with the gaming machines 10 and any other initialization procedures or checks, is when the game 16 is being played by a player on one or more of the gaming machines 10. The controller 52 continually checks or monitors for the existence of a trigger event, as indicated by decision block B. For server-based trigger events, the controller 52 may determine whether or not a trigger event has occurred. For gaming machine based trigger events, the controller 52 may monitor communications from the gaming machines 10 for a signal indicating that a trigger event has occurred. If the prize of the bonus game is a progressive prize, the controller 52 (or another computational device) receives signals from the gaming machines 10 that indicate the source(s) of the progressive prize and increments the progressive prize in response.

When a trigger event occurs, in step C the controller 52 determines, according to any method described herein above or any other suitable method including always selecting every gaming machine 10, which gaming machines are eligible to participate in the bonus game. Once the eligible games have been identified, the controller 52 sends a signal to the control circuit 36 of each eligible gaming machine 10 that indicates to the gaming machine 10 that it is to participate in a bonus game. This signal causes play of the base game 16 on each of the gaming machines 10 to pause (step D). Before proceeding to step E, the controller 52 will typically await for an acknowledgement from each gaming machine 10 that is to participate in the bonus game that it is ready, which may be required if each gaming machine 10 is to finish an existing play. Alternatively, the controller 52 may wait a predetermined time that is sufficient to enable any gaming machine 10 to become ready.

In steps E and F, each gaming machine 10 is allocated a bingo card. The allocation may be automatic, with no input from the player of each gaming machine 10. Alternatively, the player may have some input into the bingo card that is allocated to the gaming machine, for example, by selecting within a time limit one of say three cards presented to the player. In order to avoid holding up play if the time limit expires, the selection may be made automatically. In an alternative embodiment, each gaming machine 10 may be responsible for generating its own bingo card and advising the controller 52 when this process has been successfully completed.

After each gaming machine 10 has been allocated a bingo card, the display 14 of each gaming machine 10, if used, is controlled to display the bonus game, including showing the allocated bingo card (step G). As described herein above, the secondary display 58 or another display if one is provided, may alternatively be used.

In step H, the controller 52 displays on the secondary display 58 (or elsewhere if the secondary display 58 is used for the bonus game) information relating to the bonus game that is about to be played, including for example the amount of the award that is being played for. Various other information, artwork or similar may also be displayed on the secondary display 58 to draw attention to the gaming machines participating in the bonus game.

In steps I through M, the controller 52 controls play of the bonus game. The bingo balls, in this example numbering seventy-five in total, are selected and displayed, with matching symbols in the bingo cards on each of the gaming machines 10 marked off until one or more gaming machines 10 reach a "bingo". In steps L and M, the controller determines how close each gaming machine 10 is to achieving a "bingo" and what the progress of each gaming machine towards achieving a "bingo" is in comparison to the leading gaming machine(s). This information is displayed on the gaming machines 10 and is updated after each bingo ball has been selected.

Once a gaming machine achieves a "bingo", in step N the controller 52 displays appropriate information, which may include animations that indicate the winning gaming machine(s) 10, allocates the award to the winning gaming machine(s) 10 and then in step O returns control of the display 14 and secondary display 58 if required, to the gaming machines 10 to enable continued play of the base games.

Where the number that results from the calculation of the award divided by the number of gaming machines does not result in an integer number, then the controller 52 may round the award up or down to one of the two integers that the calculation provided.

If multiple prizes are offered for a single bonus game, after step N, the process returns to step I until the next pattern in the card that results in a "bingo" is achieved. Of course, in the embodiment that offers multiple prizes it must be kept in mind that the gaming machine 10 (or machines) that won the previous prize may have a head-start on the other gaming machines 10 for achieving the next prize or major and minor prizes could be wan simultaneously. Optionally, a gaming machine 10 that wins one prize may be prevented from continuing in the game, or alternatively only the final prize may be substantial and the intermediate prizes relatively insubstantial.

While the present invention may be particularly suited to tournament games where the players compete against each other for the prize, it is possible to use aspects of the present invention in a shared game where the players are not competing against each other. For example, in a bingo game the casino may hold one or more cards and the prize for the bonus game may be split amongst participating gaming machines if any one of the gaming machines reaches bingo before the casino. The status of the casino cards may be displayed, for example on the overhead display 56 and the indicators 86 and 88 may refer to the leading casino card rather than the leading player. Alternatively, there may be a limited number of draws made. In a further alternative gaming machines may be grouped, with each group either competing against other groups and/or against cards held by the casino. For bingo, the winner of group play be determined as the first group to have all players reach bingo. For poker, the casino may also hold a hand, whereby the players need to beat the casino hand before any prize is allocated. The casino may also hold a hand for blackjack. In a further alternative, the gaming machines may still compete against each other, but an award is not given if all the gaming machines are "beaten" by the casino.

It is therefore an advantage of the invention that a tournament gaming system 50 is provided which enhances player enjoyment and excitement. For example, a possible advantage of the present invention over systems where a player, or a gaming machine on a player's behalf, puts a bet on the outcome of a race, wheel spin, or other event, is that increased excitement and anticipation can be achieved by having a number of events that determine the final outcome. Systems where a bet is put on an event are relatively simple and players may become bored of these games quicker than a system of the present invention. A possible advantage of the present invention over providing a bonus game on an individual machine is that the sharing of the bonus game between multiple gaming machines may assist in adding excitement, particularly when the gaming machines are competing for a prize. Also, sharing the bonus game between gaming machines may allow the bonus game to be invoked more often than a bonus game of a standalone gaming machine, while still retaining a similar level of award for winning the bonus game.

The use of the indicator 86 and further indicator 88 also heightens the sense of enjoyment of players as a heightened sense of competition is generated.

Figure 11:
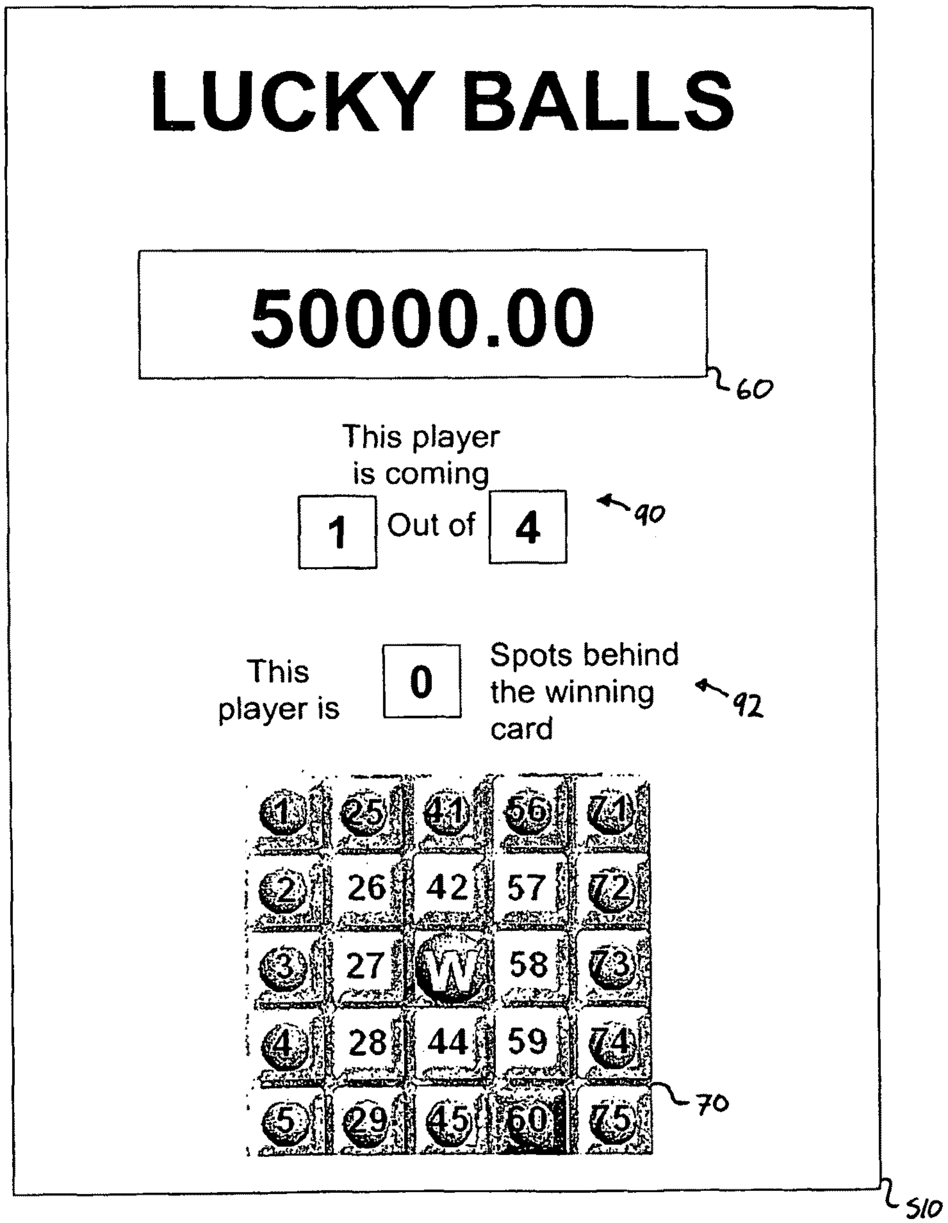
FIG. 11 shows a screen display for a gaming system according to another aspect of the present invention.

To further add excitement, add to the sense of competition and/or to further entice onlookers to play the gaming system of the present invention, a further screen display S10 may be provided. The screen display S10 is shown in FIG. 11 and may be provided on any available screen that is able to be viewed by onlookers. For example, the screen display S10 may be provided on a video display device located in the top box 26 of the gaming machines 10 that are participating in a tournament (in which case screen displays S6-S9 would be entirely displayed on the display 14). The screen display S10 is an example of what may be displayed on a gaming machine 10 when the screen display S8 (FIG. 8) is displayed on the display 14 of that gaming machine.

Alternatively, a screen display S10 for each gaming machine 10 that is participating in a tournament may be displayed on one or more other displays, for example the overhead display 56, with suitable modifications that may be necessary to identify the gaming machine or player that the screen display S10 relates to. For example, where the players have identified themselves to the gaming machines 10, the screen display S10 may refer to each player by their gaming name. Another alternative is for each gaming machine 10 to be identified, for example by a number that is positioned above each gaming machine 10, in which case the screen display S10 may refer to the individual gaming machine.

The screen display S10 includes a third indicator 90 that indicates to onlookers the position of the player or gaming machine relative to other players or gaming machines that are participating in the tournament. In FIG. 11 the indicator is in the form of a statement "This player is coming X out of X". Alternatives to this may be used, for example displaying a number showing the position of the player irrespective of the number of other players, displaying words like "This player is leading" and "This player is second".

A fourth indicator 92 may also be provided on the screen display S10, the fourth indicator 92 indicating how far behind the leading player the player or gaming machine is. The fourth indicator 92 therefore corresponds to the further indicator 88 in screen display S8. The card 70 from the screen display S8 may also be reproduced in the screen display 10 to show the progress of the player to onlookers. Furthermore, the prize 60 that is being played for may also be reproduced in the screen display 10.

In one embodiment of the invention, the progress of each gaming machine 10 towards "bingo" (or another objective if an alternative tournament bonus game is provided) may be at least partly dependent on some activity of the players of the gaming machines 10. For example, in a bingo tournament, the selection of bingo balls may not be an entirely independent random event, or may not be an independent random at all, instead depending on the play of a base game on the gaming machines 10. In this way, for example, if a player achieves a win on the base game, then their chances of a ball being produced that matches one in their card may be increased, up to a maximum of 100% probability, which may occur if a major prize is achieved in the base game. As the operation of the base game is random, there is still a random element to the drawing of the bingo balls. Players of the gaming machines may have to spend credits to play the base game during the tournament, but could equally be provided free play of the base game or another game. Providing player input in this way may further increase the sense of competition and add further interest to onlookers, which may further increase the number of people who want to play the gaming machines 10 forming part of the gaming system of the present invention.

It will be appreciated by persons skilled in the art that numerous variations and/or modifications may be made to the invention as shown in the specific embodiments without departing from the spirit or scope of the invention as claimed in the accompanying claims. The present embodiments are, therefore, to be considered in all respects as illustrative and not restrictive.

The invention claimed is:

1. A gaming system comprising a controller a shared display, and a plurality of gaming machines, each gaming machine:

a) comprising at least one individual display, b) operable by a player to play at least one base game, and c) being in communication with the controller, the gaming system allowing each of the plurality of gaming machines to participate in a shared secondary game that is common to the plurality of gaming machines, wherein the individual display of each gaming machine is caused to display a token indicative of an entry into the shared secondary game, the token comprising a game play area for selecting one or more events from a plurality of possible events of the secondary game, the shared secondary game having an outcome resulting in the allocation of an award to the player of at least one of the plurality of gaming machines, wherein the controller causes (1) the plurality of possible events of the secondary game that are selected by the controller on the shared display and, upon selection, displayed to players on each individual display and matched to the selection of one or more events on the token, the plurality of events being common to every one of said plurality of gaming machines, a probability of at least one of the plurality of events occurring during game play of the secondary game being influenced by an occurrence of a base game event during game play of the base game, and (2) a randomly determined component that dictates whether the outcome is achieved by any one of said plurality of gaming machines, wherein the outcome is capable of being achieved by any one of the plurality of gaming machines and without any other one of the plurality of gaming machines also achieving the outcome.

2. The gaming system of claim 1, wherein the plurality of events is the selection of a subset comprising a first number of pieces of information from a set comprising a second number of pieces of information, the first number being at least two and the second number being greater than the first number, and wherein said selection is random and comprises the randomly determined component that dictates whether the outcome is achieved by any one of said plurality of gaming machines.

3. The gaming system of claim 2, wherein during play of the secondary game, each gaming machine displays to its respective player a second set comprising a third number of pieces of information and wherein the outcome is capable of being achieved for any one of the plurality of gaming machines without any other one of the plurality of gaming machines also achieving the outcome because of variations in the third set between gaming machines.

4. The gaming system of claim 3, wherein the second set comprises pieces of information selected from the set comprising the second number of pieces of information.

5. The gaming system of claim 4, wherein the secondary game is a bingo game, whereby the subset is formed by a sequential random selection of bingo balls and the second set is formed by a random determination of a bingo card for each gaming machine.

6. The gaming system of claim 4, wherein the secondary game is selected from a group comprising bingo, poker, keno and blackjack.

7. The gaming system of claim 1, wherein the plurality of events comprises a series of events over a period of time and wherein the gaming system includes at least one indicator that, during play of the secondary game the gaming system provides an indication of the progress that each gaming machine has made towards the outcome relative to at least one other gaming machine in the plurality of gaming machines.

8. The gaming system of claim 7, wherein the at least one indicator comprises representations on the at least one display of each of the plurality of gaming machines.

9. The gaming system of claim 7, wherein the gaming system displays a position of each gaming machine on a display that is viewable by onlookers to the gaming system.

10. The gaming system of claim 1, wherein at least one indicator comprises representations of a rank of each gaming machine in an order comprising the gaming machine that is closest to achieving the outcome to the gaming machine that is furthest from achieving the outcome in the plurality of gaming machines.

11. The gaming system of claim 1, wherein at least one indicator comprises representations that show the extent that each gaming machine of said plurality of gaming machines is behind the gaming machine that is closest to achieving the outcome.

12. The gaming system of claim 1, wherein the award is a progressive prize that has been contributed to by play of the base game on each of the plurality of gaming machines.

13. The gaming system of claim 1, wherein the award is variable and at least one of a duration and an expected duration of the secondary game is dependent on a size of the award.

14. The gaming system of claim 1, wherein there are a plurality of different awards that are awardable as a result of play of the secondary game.

15. The gaming system of claim 14, wherein one of said plurality of awards is selected for each game of the secondary game.

16. The gaming system of claim 14, wherein the plurality of events are sequential and the secondary game results in multiple outcomes that occur after a differing number of the plurality of elements have been displayed and wherein at least two of said outcomes result in the allocation of an award to a player of at least one of the plurality of gaming machines.

17. The gaming system of claim 1 including at least one further display that is located generally above the plurality of gaming machines and is controlled by the controller, wherein the plurality of events are displayed on the at least one further display.

18. The gaming system of claim 1, wherein the plurality of gaming machines that participate in the secondary game are selected from all gaming machines that are in communication with the controller according to predetermined selection criteria.

19. The gaming system of claim 18, wherein the predetermined selection criteria comprise at least one from the set of:

i) gaming machines that are currently being played, ii) selection of gaming machines that are currently being played according to further predetermined selection criteria, and iii) gaming machines that progress past a qualifying round.

* * * * *